April 19, 1966 R. J. HAMMOND 3,246,900

PICKUP MECHANISM FOR PHONOGRAPHS

Filed Feb. 5, 1962

INVENTOR.
Robert J. Hammond
BY Brown, Jackson, Boettcher & Dienner
Attys.

United States Patent Office 3,246,900

Patented Apr. 19, 1966

3,246,900

PICKUP MECHANISM FOR PHONOGRAPHS

Robert J. Hammond, Stevensville, Mich., assignor to V-M Corporation, Benton Harbor, Mich., a corporation of Michigan Filed Feb. 5, 1962, Ser. No. 170,915

13 Claims. (Cl. 274—23)

The present invention relates to mechanism for mounting a pickup cartridge on a phonograph tone arm.

More specifically, the invention relates to cartridge mounting apparatus comprising a steerable wheel for supporting the end of a tone arm so as to permit reduced needle pressure, and means for steering the supporting wheel to move the tone arm laterally across a record being reproduced.

Various structural arrangements have previously been proposed for phonographs to effect reduced needle pressure. One of the problems encountered with many such known devices is that as needle pressure is reduced it is more difficult to obtain accurate tracking of the needle in a record groove, and it is difficult to develop sufficient tracking force to move the tone arm laterally across the record. In other words, it is common to pull the tone arm across the record by means of the force developed between the needle and the record groove, and when needle pressure is substantially reduced, the resultant tracking force will often not be sufficient for this purpose.

The present invention is also concerned with the problem of shocks as caused by application of external forces to a phonograph or to the tone arm thereof. When a rigidly mounted cartridge is utilized, such shocks are transmitted through the needle to a record being reproduced, resulting in likelihood of damage to both.

One object of the present invention is to provide cartridge mounting mechanism which permits a needle or stylus to accurately track a groove in a record being reproduced at a needle pressure which develops a tracking force substantially less than the force required to move the tone arm across the record, and which nevertheless is effective in thus moving said tone arm.

Another object of the invention is to provide means for mounting a pickup cartridge which permits the latter to move vertically about a horizontal pivot axis during reproduction of a record so as to render the cartridge substantially insensitive to shocks.

A further object of the invention is to provide cartridge mounting means of the type aforementioned wherein the cartridge needle pressure is determined by the balancing of the cartridge about its own pivot axis and is thus independent of the weight or other physical characteristics of the tone arm from which it is supported.

Still another of my objects is to provide mechanism of the foregoing type wherein the tracking error is independent of the length, offset, or other physical characteristics of the tone arm.

Figure 1:
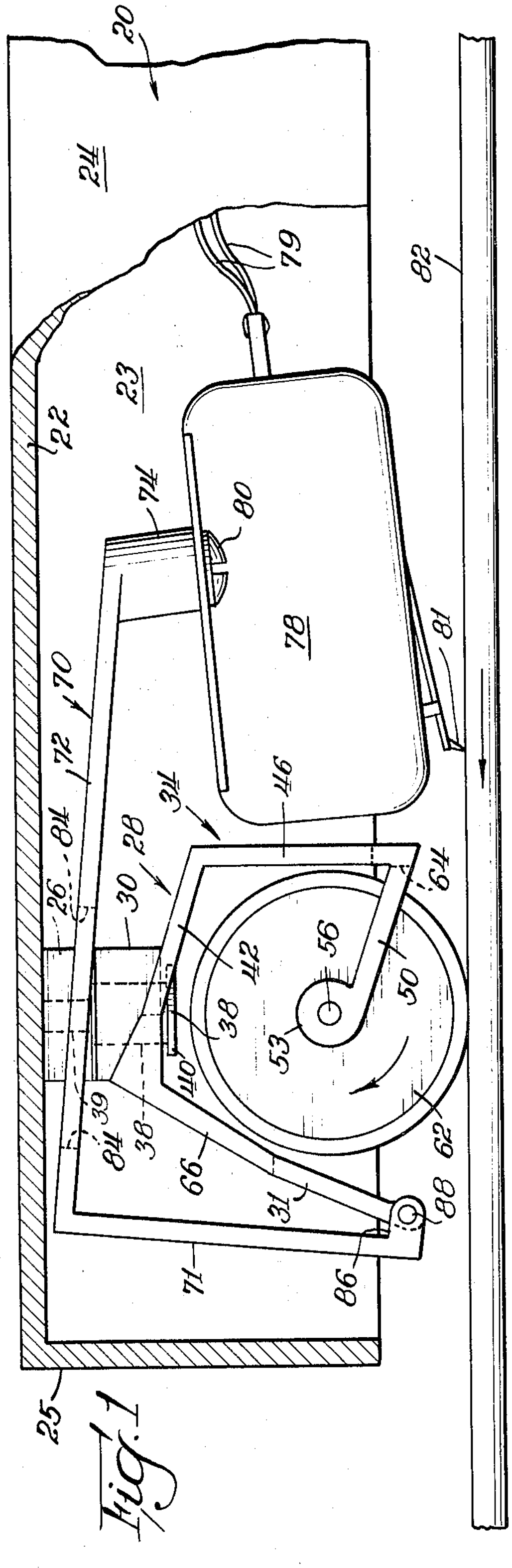
Figure 2:
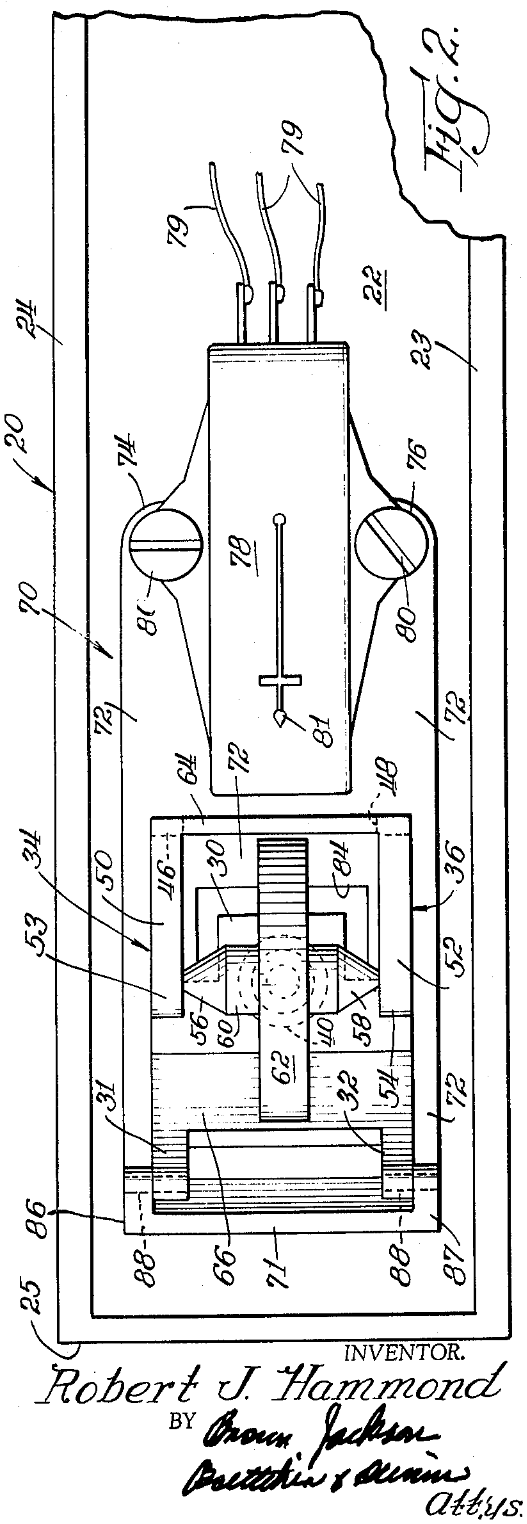

Other advantages and uses of my invention will be apparent, or become so, as I describe my invention in greater detail in conjunction with the accompanying drawings in which:

FIGURE 1 is a fragmentary side elevational view of a phonograph tone arm embodying pickup mechanism constructed in accordance with the invention, one side wall of the tone arm being partly broken away to better illustrate said mechanism; and FIGURE 2 is a bottom plan view of the mechanism of FIGURE 1.

Referring now to the drawings, there is indicated generally at 20 a phonograph tone arm having a top wall 22, a pair of side walls 23 and 24, and an outer end wall 25, the tone arm being generally of an inverted U-shape in cross section as is common in the art. The tone arm is provided with a rectangular boss 26 which is integral with or suitably secured to the underside of the top wall 22 so as to project downwardly therefrom.

A yoke 28, made of nylon or other suitable material, is supported from the tone arm 20 adjacent the boss 26 in such a manner as to be pivotable about a vertical axis. The yoke 28 includes a rectangular boss 30, a pair of outer support legs 31 and 32, and a pair of inner roller support arms 34 and 36. The rectangular boss 30 is similar in configuration to the tone arm boss 26, and the yoke 28 is positioned so as to locate the boss 30 immediately beneath and in substantial vertical alignment with the corresponding boss 26. A vertical pivot pin 38 having a peripheral flange 40 at its lower end extends through an aperture in the rectangular boss 30 and has a reduced diameter upper end portion 39 which is fixedly mounted in an aperture in the tone arm boss 26. The peripheral flange 40 serves to support the yoke 28 which is free to pivot about the vertical axis of the pin 38.

The roller support arms 34 and 36 first extend inwardly and slightly downwardly at 42, then project substantially downwardly at 46 and 48, and finally extend outwardly and slightly upwardly at 50 and 52. The arm sections 50 and 52 terminate in hub portions 53 and 54 which serve to rotatably support conical ends 56 and 58, respectively, of a wheel shaft or axle member 60, a wheel 62 being fixedly mounted on the shaft 60 approximately intermediate its ends. The wheel or roller 62 and the shaft 60 are free to rotate about the horizontal axis of the shaft with the conical ends of the latter serving as pivots therefor.

The yoke arm portions 46, 48, 50 and 52 are constructed to provide a predetermined amount of vertical flexibility so as to comprise yielding means which will permit limited relative vertical movement between the wheel or roller 62 and the tone arm 20. In addition, the roller is preferably made of a compliant material such as rubber or the like whereby the roller support arms 34 and 36 and the roller will act together as a shock absorber.

At the lower end of the individual arm portions 46 and 48, there is provided a horizontal cross bar 64 therebetween to increase the lateral stability of the roller support arms. The forward or outer support legs 31 and 32 of the yoke terminate at their upper ends at a solid plate portion 66 which extends upwardly and inwardly therefrom joining with the arm sections 42 at the base of the rectangular boss 30.

A cartridge supporting bracket 70 comprises a generally L-shaped plate, made of nylon or other suitable material, having a first plate section 71 inclined slightly from the vertical, and an integral perpendicular plate section 72 extending inwardly and slightly downwardly from the upper end of the plate 71, the generally horizontal plate 72 having a pair of laterally spaced cylindrical hubs 74 and 76 which are integral with said plate and project substantially downwardly from the inner end thereof.

A conventional pickup cartridge 78 is fixedly mounted to the hubs 74 and 76 by suitable fastening means such as the screws 80 which may be engaged in threaded apertures provided in the hub members. The pickup cartridge carries a needle or stylus 81 in the usual manner for tracking in the groove of a record, and lead wires for the pickup are shown at 79. A fragmentary portion of a record in operative relation with the pickup 78 is illustrated schematically at 82, the latter being adapted to be driven in the direction indicated.

The plate 72 of the supporting bracket 70 is provided with a rectangular aperture 84 which is somewhat greater in its longitudinal and lateral dimensions than the rectangular bosses 26 and 30 on the tone arm 20 and yoke 28, respectively, the bracket being positioned so that said bosses project through the aperture therein.

At the lower end of the plate portion 71 there are formed a pair of integral inwardly projecting mounting lugs 86 and 87, and the cartridge supporting bracket 70 is pivotally mounted at the lower ends of the support legs 31 and 32 by means of a pair of pivot pins 88 which project through the mounting lugs and into corresponding support legs.

It will be noted that when the tone arm 20 is lifted, the bracket 70 will pivot about the pins 88 and the plate 72 will move generally rearwardly or to the right as viewed in FIGURE 1, thus permitting the cartridge 78 to drop below its normal playing position until the wall of the aperture 84 engages the rectangular tone arm boss 26. In this manner, the cartridge 78 is positioned relative to the tone arm, the boss 26 serving both as a vertical stop and also as a lateral locator for the cartridge upon lifting of the tone arm.

In operation, the tone arm 20 is operatively positioned relative to a record such as shown at 82 so that the needle 81 may track the groove in the record as the latter is rotated. Movement of the record is as indicated by the arrow in FIGURE 1, whereby the roller 62, which is disposed outwardly of the cartridge (relative to the tone arm) will trail the stylus 81 as the latter tracks the record groove.

It will be seen that the cartridge 78 is pivotally mounted by the pivot pins 88 so that it is free to move in a substantially vertical direction relative to the tone arm. The tone arm is supported by the wheel 62 which rolls on the record surface, whereby shocks caused by the application of external forces to the tone arm or the phonograph of which it is a part will not be transmitted through the cartridge or needle. It will further be noted that needle pressure is totally independent of the weight or other physical characteristics of the tone arm, and is determined by the moment which its own weight and that of the bracket 70 create about the pivots 88. Needle pressure can be determined by adding weight to the cartridge mounting bracket on the appropriate side of the pivot pins 88.

One of the reasons why the foregoing structure can be utilized to effectively provide substantially reduced needle pressure is due to the fact that the cartridge serves to steer the wheel 62 which in turn pulls the tone arm across the record. Thus, the needle pressure need not be increased to develop tracking forces sufficient to move the tone arm across the record, but rather the needle pressure need only be of a magnitude which will create tracking forces sufficient to pivot the yoke 28 and wheel 62 about the vertical axis of the pin 38. In the latter instance, the cartridge 78 as it tracks in the groove of a record being reproduced will move laterally and steer the yoke 28 and roller 62 through its connection with the yoke at the lugs 86 and 87, and in this manner the roller will pull the tone arm 20 across the record. It will further be understood from the foregoing that the tracking error of the needle 81 is independent of the physical characteristics of the tone arm.

In order to achieve optimum results from the cartridge mounting structure described hereinabove, it is preferable that the mass and the relative position of certain of the elements thereof be determined with particular objectives in mind. For example, with respect to the tone arm 20 and the supporting wheel 62, it is preferable that the mass of the tone arm and the compliance of the wheel be selected to provide a very low frequency resonance that is well damped. If this is done, then imperfections in the wheel, wheel bearings, or on the record surface, which occur at a higher frequency, will not move the arm. More important, such imperfections will not vibrate the pins 88 about which the cartridge 78 is adapted to pivot. A preferred frequency is approximately five cycles per second in order to effect optimum isolation of the pickup cartridge and the record from the effect of wheel noise.

Furthermore, the center of mass of the cartridge 78 and bracket 70 should be as close as possible to the tip of the needle 81 so that any vibration at the pivot pins 88 will not cause output. In this manner, it is possible to effect an optimum signal to noise ratio. The effective mass of the cartridge and the mounting bracket should be several grams in order to provide good base response.

A further important factor to consider is the location of the roller 62 and the needle 81. It is preferable that the horizontal axis of the roller intersect the vertical axis of the pin 38, substantially as shown in FIGURE 1, and that the point of wheel contact with the record 82 lie as nearly as possible to said vertical axis. The distance from the point of wheel contact to the tip of the needle 81 should preferably be between approximately one-half inch and one inch in order to provide a satisfactory tracking angle and at the same time permit steering of the roller 62 with a relatively small tracking force.

Regarding the location of the pivot pins 88, it has been found desirable to position these pivots as closely as possible to the record surface in order to account for warped wow considerations and for variations in needle pressure, and it is also desirable to position said pivots as far as possible from the center of mass of the assembly of the bracket 70 and the cartridge 78.

While I have illustrated my invention in a certain preferred form, I do not intend to be limited to such form, except insofar as the appended claims are so limited, since modifications coming within the scope of my invention will be readily suggested to others with my disclosure before them.

I claim:

1. In a phonograph or the like, in combination, a tone arm, supporting means pivotally secured to said tone arm and rotatable about an axis generally perpendicular to the plane of a record in playing position, roller means carried by said supporting means and engageable against the surface of a record being reproduced so as to guide and support said tone arm, steering means operatively associated with said supporting means for pivoting the latter so as to steer said roller means, and a pick-up cartridge operatively associated with said steering means for guiding the same as said cartridge tracks a groove in a record being reproduced.

2. In a phonograph or the like, in combination, a tone arm, supporting means pivotally secured to said tone arm and rotatable about an axis generally perpendicular to the plane of a record in playing position, roller means carried by said supporting means and engageable against the surface of a record being reproduced so as to guide and support said tone arm, steering means operatively associated with said supporting means for pivoting the latter so as to steer said roller means, said steering means being also pivotable about an axis parallel to the plane of a record in playing position, and a pick-up cartridge carried by said steering means for guiding the same as said cartridge tracks a groove in a record being reproduced.

3. In a phonograph or the like, in combination, a tone arm, supporting means pivotally secured to said tone arm and adapted to rotate about an axis generally perpendicular to the plane of a record in playing position, roller means carried by said supporting means and adapted to contact the surface of a record being reproduced so as to guide and support said tone arm, steering means operatively associated with said supporting means for pivoting the latter so as to steer said roller means, said steering means being also pivotable about an axis parallel to the plane of a record in playing position, and a pick-up cartridge having a stylus thereon carried by said steering means for guiding the same as said cartridge tracks a groove in a record being reproduced, said cartridge and steering means being balanced with respect to the last-mentioned pivotal axis in such a manner as to provide optimum stylus pressure during reproduction of a record.

4. In a phonograph or the like, in combination, a tone arm, supporting means comprising a yoke pivotally secured to said tone arm and adapted to rotate about an axis generally perpendicular to the plane of a record in playing position, roller means carried by said yoke and adapted to contact the surface of a record being reproduced so as to guide and support said tone arm, a steering bracket pivotally connected to said yoke so as to be adapted to rotate said yoke and steer said roller means, the axis of the last-mentioned pivotal connection being parallel to the plane of a record in playing position, and a pick-up cartridge mounted on said steering bracket for guiding the same as said cartridge tracks a groove in a record being reproduced.

5. In a phonograph or the like, in combination, a tone arm, supporting means comprising a yoke pivotally secured to said tone arm and adapted to rotate about an axis generally perpendicular to the plane of a record in playing position, a roller carried by said yoke and adapted to contact the surface of a record being reproduced so as to guide and support said tone arm, said yoke including yielding means to permit relative vertical movement between said roller and said tone arm, a steering bracket pivotally connected to said yoke on opposite sides of said roller so as to be adapted to rotate said yoke and steer said roller, the axis of the last-mentioned pivotal connection being parallel to the plane of a record in playing position, and a pick-up cartridge mounted on said steering bracket for guiding the same as said cartridge tracks a groove in a record being reproduced.

6. In a phonograph or the like, in combination, a tone arm, supporting means comprising a yoke pivotally secured to said tone arm and adapted to rotate about an axis generally perpendicular to the plane of a record in playing position, said yoke having a pair of relatively flexible arms for carrying an axle in parallel relation to said plane, said arms being inclined with respect to a perpendicular to said plane, a roller mounted on said axle and adapted to contact the surface of a record being reproduced so as to guide and yieldingly support said tone arm, steering means operatively associated with said yoke for pivoting the latter so as to steer said roller, and a pick-up cartridge carried by said steering means for guiding the same as said cartridge tracks a groove in a record being reproduced.

7. In a phonograph or the like, in combination, a tone arm, supporting means comprising a yoke pivotally secured to the underside of said tone arm proximate to the outer end thereof and adapted to rotate about an axis generally perpendicular to the plane of a record in playing position, said yoke having a pair of supporting arms for carrying an axle in parallel relation to said plane and a pair of supporting legs disposed substantially between said axle and said outer end of said tone arm, a roller mounted on said axle and adapted to contact the surface of a record being reproduced so as to guide and support said tone arm, a steering bracket connected at one end to said pair of supporting legs by pivot pin means parallel to said plane, the other end of said bracket extending over said roller to the inward side thereof, and a pick-up cartridge mounted on said other end for guiding said bracket as said cartridge tracks a groove in a record being reproduced, whereby said roller will support and guide said tone arm and said cartridge will steer said roller across the surface of a record being reproduced.

8. The invention of claim 7 wherein said pivot pin means is positioned outwardly of said axle so as to trail the latter and is located nearer the surface of a record in playing position than is said axle.

9. The invention of claim 7 wherein said yoke is pivotally secured adjacent the underside of a boss which extends downwardly from the underside of said tone arm and said bracket is provided with an aperture through which said boss extends whereby when said tone arm is lifted said boss will engage said bracket at the edge of said aperture so as to serve as a vertical stop and a lateral locating device for said cartridge.

10. In a phonograph, in combination, a tone arm, supporting means pivotally secured to said tone arm and adapted to rotate about a generally vertical axis, roller means carried by said supporting means and adapted to roll on the surface of a record being reproduced so as to guide said tone arm across the record and support said tone arm a predetermined distance from said record, steering means operatively associated with said supporting means for pivoting the latter so as to steer said roller means, and a pickup cartridge carried by said tone arm for engagement with a record being reproduced and movable substantially vertically relative to said tone arm, said roller and pickup cartridge being adapted to engage said record simultaneously whereby the pressure between said pickup cartridge and said record is independent of the weight or other physical characteristics of said tone arm.

11. The invention of claim 10 wherein said roller means comprises a roller mounted for rotation about a substantially horizontal axis which axis is approximately intersected by the first-mentioned vertical axis of rotation of said supporting means.

12. In a phonograph or the like, in combination, a tone arm, supporting means secured to said tone arm, a roller carried by said supporting means and engageable on the surface of a record being reproduced so as to roll on said record and thereby support said tone arm a predetermined distance from said record, said roller being rotatable about a generally horizontal axis relative to said supporting means for rolling on said record, and said supporting means being pivotable conjointly with said roller about a generally vertical axis to permit steering of said roller across said record, steering means connected with said supporting means for controlling the pivotable movement of the latter about said vertical axis in order to steer said roller on said record and thereby pull said tone arm across said record, and a pickup cartridge carried by said tone arm for engagement with a record being reproduced and movable substantially vertically relative to said tone arm, said roller and said pickup cartridge being simultaneously engaged against said record whereby the pressure between said pickup cartridge and said record is independent of the weight or other physical characteristics of said tone arm.

13. In a phonograph or the like, in combination, a tone arm, supporting means secured to said tone arm, a roller carried by said supporting means and engageable on the surface of a record being reproduced so as to roll on said record and thereby support said tone arm a predetermined distance from said record, said roller being rotatable about a generally horizontal axis relative to said supporting means for rolling on said record, and said supporting means being pivotable conjointly with said roller about a generally vertical axis to permit steering of said roller across said record, steering means connected with said supporting means for controlling the pivotable movement of the latter about said vertical axis in order to steer said roller on said record and thereby pull said tone arm across said record, substantially horizontal pivot means carried by said tone arm, and a pickup cartridge pivotally mounted on said pivot means for engagement with a record being reproduced, said pickup cartridge being movable substantially vertically relative to said tone arm, and said roller and pickup cartridge being simultaneously engaged against said record whereby the pressure between said pickup cartridge and said record will be determined by the moment which said pickup cartridge produces relative to said horizontal pivot means and will be independent of the weight or other physical characteristics of said tone arm.

References Cited by the Examiner

UNITED STATES PATENTS 2,586,422 2/1952 Fisher -------------- 274—15

FOREIGN PATENTS 206,237 2/1957 Australia.
260,626 8/1949 Switzerland.

NORTON ANSHER, *Primary Examiner.*

ALDRICH F. MEDBERY, EVON C. BLUNK, *Examiners.*